April 7, 1925.
T. F. JETER
BURIAL VAULT
Filed April 28, 1924
1,532,313
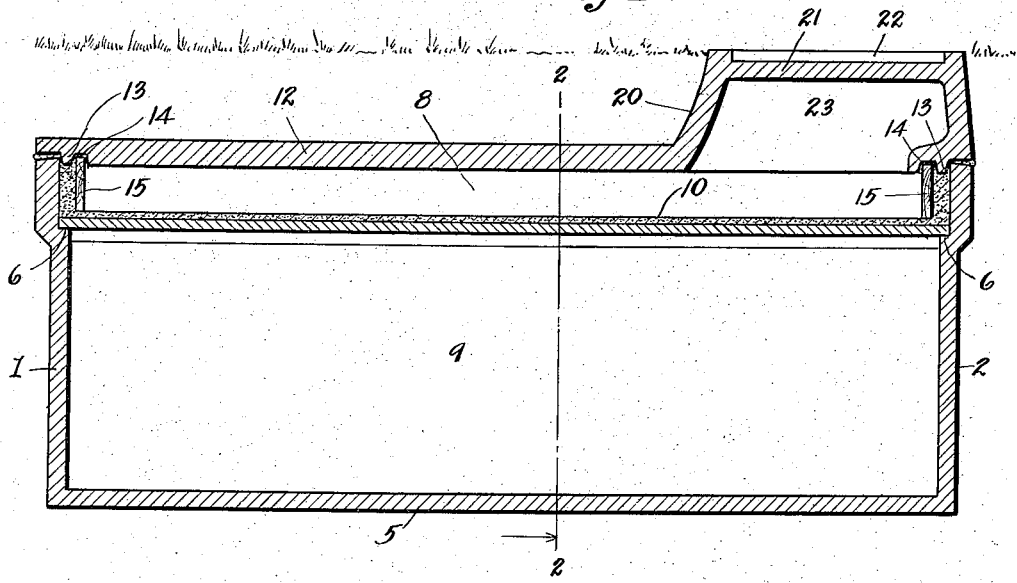
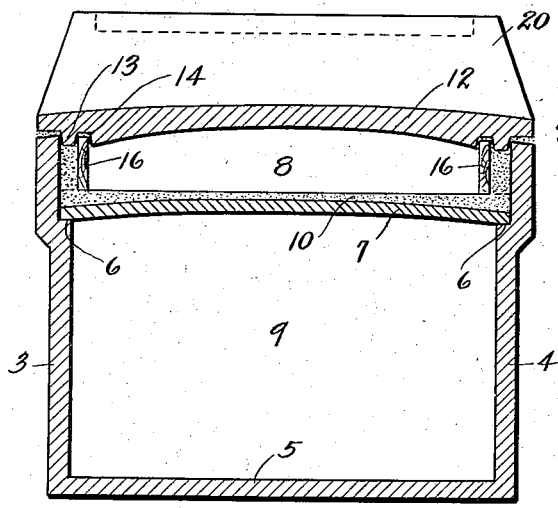
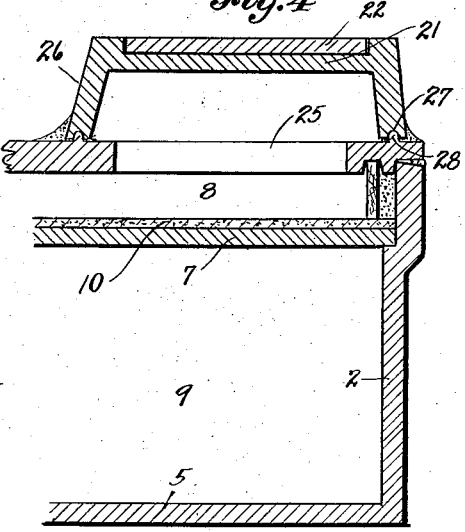
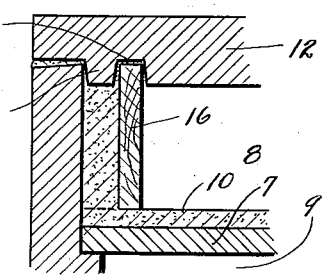
INVENTOR
THOMAS F. JETER
BY
Richard J. Cook
ATTORNEY Patented Apr. 7, 1925.

1,532,313

UNITED STATES PATENT OFFICE.

THOMAS F. JETER, OF EVERETT, WASHINGTON.

BURIAL VAULT.

Application filed April 28, 1924. Serial No. 709,491.

*To all whom it may concern:*

Be it known that I, THOMAS F. JETER, a citizen of the United States, and a resident of Everett, Snohomish County, Washington, have invented certain new and useful Improvements in Burial Vaults, of which the following is a specification.

This invention relates to improvements in burial vaults and particularly to vaults of that class usually referred to as surface vaults and which are provided with a sealed casket chamber below a sealed dead air chamber.

It is the principal object of this invention to provide a burial vault that is an improvement on the vault shown and described in United States Patent No. 1,391,386, issued to me on September 20, 1921.

Explanatory to this invention, it will be stated here that in many of the present day cemeteries, for the conservation of space, lots are being laid out end to end and side by side leaving no intermediate space for lanes or walks about the graves as heretofore provided and as a result of this the full surface vault, as shown and described, in the patent above referred to, is not desirable.

In some cemeteries such vaults are prohibited for the reason that they take up too much surface area that otherwise could be used for lawn space and furthermore they are a hindrance to the operation of lawn mowers, etc.

It will be stated also that vaults of the present character and also those of the patent mentioned, wherein there is a dead air space above the casket chamber, will not be entirely satisfactory unless the air within the said dead air space is kept dry. This of course, is not difficult so long as the top of the vault is exposed above the surface of the ground but should the vault be covered with earth, some other provision has to be made for retaining the dead air chamber dry.

In view of the above, it has been the object of this invention to provide a burial vault that is so constructed that, while it still retains all the desirable features of the full surface vault, it provides for locating the vault sufficiently below the surface as to provide ground area above it for lawn planting.

Another object of the invention is to provide a vault of the above character wherein the cover section overlying the dead air chamber has an upwardly extended portion adapted to be located flush with the ground surface for the mounting of a marker or slab, and which further provides for an extension of the dead air chamber to the ground surface so that heat from the outside, absorbed through this exposed portion, will retain the air chamber perfectly dry.

A still further object of this invention resides in the provision of a sealing joint, between the vault body and cover, of novel construction and which is absolutely air and moisture proof.

In accomplishing these and other objects of the invention, I have provided the improved details of construction, the preferred forms of which are shown in the accompanying drawings, wherein—

Figure 1 is a longitudinal sectional view in a vertical plane through a vault embodied by the present invention.

Figure 2 is a section taken transversely of the vault on the line 2—2 in Figure 1.

Figure 3 is an enlarged sectional view illustrating the sealing joint between the vault rim and cover section.

Figure 4 is a sectional view illustrating an alternative construction.

Referring more in detail to the drawings—

The vault body comprises opposite end walls 1 and 2, opposite side walls 3 and 4 and a bottom wall 5, all of which preferably would be of re-enforced concrete or other plaster material construction sufficiently thick to be air and water tight. The upper portions of the walls are offset outwardly somewhat to provide an upwardly facing seat or shoulder 6 entirely about the inner surface and upon which a horizontal slab 7, slightly arched in cross section, is located to divide the vault into upper and lower chambers 8 and 9, respectively; the lower one being the casket chamber and the upper one the dead air chamber.

After the casket has been disposed in the vault and the slab 7 seated upon the shoulder, fresh concrete is poured over the slab 7 to form a sealing slab 10 that closes the joint so as to retain the casket chamber free of moisture and air tight.

Overlying the vault is a cover section 12 that rests about its edges upon the top edges of the side and end walls of the vault body and which is provided, on its under side and spaced parallel with its edges, with a depending flange 13 and just within this with a groove 14; the flange being adapted to seat snugly within the edge of the vault to retain the cover in position.

To provide a sealing joint between the cover and body, I have provided a rectangular form made up of opposite end and side boards 15—15 and 16—16, respectively. The form is somewhat smaller than the inside dimensions of the vault above the shoulder 6 and when disposed upon the slab 10 will leave a space between it and the vault walls which is then filled with fresh cement. This seal preferably would be formed right after applying the cement that forms slab 10 so that the two will set together in a single piece. The cover section is then seated upon the vault so that the upper edge of the form boards will seat within the groove 14 and flange 13 will embed itself in the soft concrete about the form which will squeeze out to fill the spaces between the top edges of the walls and cover. A seal is thus provided through which no air or water can pass and, due to the disposition of the form boards within the groove 14, they cannot be displaced before the sealing material has set.

This vault is intended to be disposed somewhat below the ground surface, as shown in Figure 1, and at the head end of the cover section there is formed an upwardly extended portion 20, the top surface 21 of which is intended to be located flush with the ground surface and this is recessed somewhat to receive a marking slab as designated at 22. This extension provides a chamber 23 having direct and open communication with the dead air chamber 8 and provides that the air of the latter may circulate in contact with the top wall of this extension so that heat absorbed by the top wall, due to its exposure above surface, will retain the air in the chambers 8 and 23 free of moisture.

In Figure 4, I have illustrated an alternative construction wherein the cover section constitutes a slab that overlies the vault and is provided at one end with an opening 25 over which a hollow head piece 26 is mounted. This head piece in substantially of the same construction as the extension of the cover section, shown in Figure 1, and is provided about its lower edge with a groove 27 for receiving a ridge 28 on the slab to provide a sealed joint. The opening 25 provides for the circulation of air from the dead air chamber into the head piece for the purpose before stated. With the vault so constructed all the advantages of the full surface vault are retained yet lawn space is provided above the vault.

Having thus described my invention, what I claim as new therein and desire to secure by Letters Patent is:

1. A vault comprising opposite side and end walls, a form located within the vault in spaced relation to the walls, a plastic sealing material filling the space between the form and vault walls and a cover section adapted to overlie the vault and having a flange on its under side adapted to seat within the edges of said walls.

2. A vault comprising opposite side and end walls, a form located within the vault in spaced relation to the walls, a plastic sealing material filling the space between the form and vault walls and a cover section adapted to overlie the vault and having a flange on its under side adapted to seat within the edges of said walls, and a groove adapted to receive therein the upper edge of said form.

Signed at Seattle, King County, Washington, this 21st day of April, 1924.

THOMAS F. JETER.